A. FRITZ.
CATTLE STANCHION.
APPLICATION FILED SEPT. 11, 1919.
1,396,034. Patented Nov. 8, 1921.
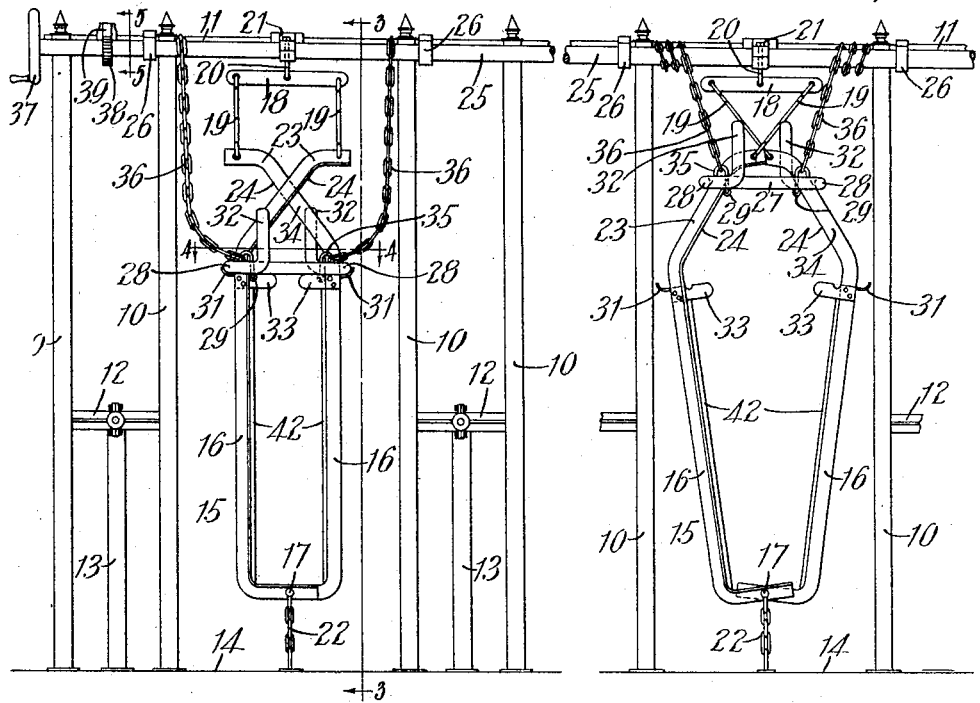
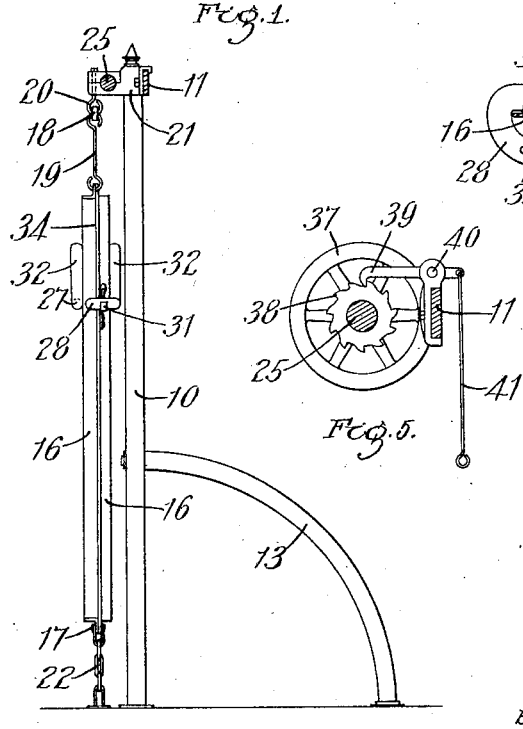
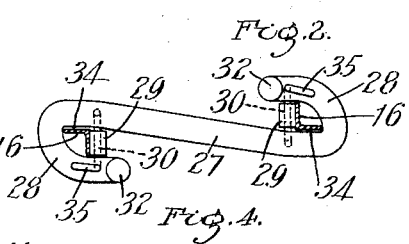
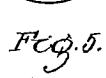
Inventor
Axel Fritz.
by his atty,
Charles N. Gooding.

UNITED STATES PATENT OFFICE.

AXEL FRITZ, OF EVERETT, MASSACHUSETTS.

CATTLE-STANCHION.

1,396,034.  Specification of Letters Patent.  Patented Nov. 8, 1921.

Application filed September 11, 1919. Serial No. 323,048.

*To all whom it may concern:*

Be it known that I, AXEL FRITZ, a citizen of the United States, residing at Everett, in the county of Middlesex and State of Massachusetts, have invented new and useful Improvements in Cattle-Stanchions, of which the following is a specification.

This invention relates to improvements in cattle stanchions.

The object of the invention is to provide a stanchion, of simple and cheap construction yet possessing great strength and durability, which is adapted to be used in series, the stanchions constituting said series being arranged to operate simultaneously to free the cattle held thereby.

Another object of the invention is to so mount the stanchions that the cattle detained thereby may have practically an unlimited movement so far as the swinging of their heads is concerned.

Another object of the invention is to provide a novel means for locking the stanchion in its closed position.

Still another object of the invention is to provide means for retaining the stanchion in its extreme open position or in any intermediate position.

The invention consists in the combination and arrangement of parts set forth in the following specification and particularly pointed out in the claims thereof.

Referring to the drawings:

Figure 1 is a front elevation of a cattle stanchion embodying my invention, the same being illustrated in its closed position.

Fig. 2 is a front elevation similar to Fig. 1 illustrating the stanchion in its extreme open position.

Fig. 3 is a side elevation of the stanchion as viewed from the line 3—3 of Fig. 1, looking in the direction of the arrows shown on said line.

Fig. 4 is a horizontal section taken on the line 4—4 of Fig. 1.

Fig. 5 is a transverse section taken on the line 5—5 of Fig. 1.

Like numerals refer to like parts throughout the several views of the drawings.

In the drawings, 10 represents upright supports, to the upper ends of which is fastened a cross piece 11. The supports 10 are furthermore strengthened by suitable tie members 12 and braces 13. The lower ends of the supports 10 and braces 13 are secured to the floor 14 of the stall in any suitable manner. Each separate stall preferably has two upright supports 10 and these are placed at such distances apart as to supply sufficient space for the cattle, the arrangement thereof being such that a wide space 15 is provided to contain suitable side bars 16 for securing the cattle within their respective stalls and with room enough left between said side bars 16 and said upright supports to permit said side bars 16 to be opened.

The upright supports 10 of one stall are arranged as close to the upright supports of the next or adjacent stall as will be permissible to provide sufficient room for the cattle without interfering with each other.

The side bars 16 which are hinged together at their lower ends at 17 are suspended in balanced relation to each other from a bar 18 by links 19, the said bar 18 being in turn suspended from a point midway of its length by a hook 20 which is fastened to a bracket 21 which in turn is supported by the cross piece 11. The lower ends of the side bars 16 are anchored to the floor 14 of the stall by a chain 22.

The upper end portion 23 of each side bar 16 is bent inwardly and these ends together form, in their closed position, an X. Each end portion 23 has an oppositely disposed inclined surface 24 and adjacent contacting surface 34. The bracket 21 also forms a bearing and support for a shaft 25 constituting a rotary member which is common to each stanchion of the series. The shaft 25 is still further supported in bearings 26 which are also secured to the cross piece 11.

As it is necessary to lock the side bars 16 in their closed position when it is desired to detain the cattle thereby, a locking member 27 is provided and this locking member in particular forms one of the novel features of this invention. The locking member 27 which is formed from a single piece of metal is bent to form a reverse S, as illustrated in Fig. 4, the portions 28 of which each partially surrounds one of the side bars 16. The locking member 27 is adapted to slide vertically upon the side bars 16 and this sliding movement is facilitated by rolls 29 mounted upon rods 30 fast in the locking member, the said rolls engaging the inclined surfaces 24 of said side bars 16.

When the locking member 27 is in its lowermost position, as illustrated in Fig. 1, it rests upon supports 31 fast to the side bars 16 and the rolls 29 coöperating with the portions 28 of the locking member will lock said side bars in the closed position illustrated in Fig. 1.

The bar from which the locking member 27 is formed terminates in two upwardly projecting ends 32 and these ends engage the side bars 16 at all times and coöperate to keep the adjacent surfaces 34 of the upper ends of said side members always in engagement with each other.

Fast to the side bars 16 and located directly beneath the locking member 27, when said locking member is in its lowermost position, are two projections 33 which are intended to prevent the locking member from being accidentally pushed upward by the neck of the animal providing said animal should raise its head to that extent.

The rods 30 besides providing a bearing for the rolls 29 are bent upwardly passing through the locking member 27 and terminate in eyes 35 to which flexible means consisting of chains 36 are attached. The other ends of the chains 36 are attached to the shaft 25 around which they are adapted to wind.

When it is desired to open the side bars 16, the shaft 25 is rotated by the hand wheel 37 thus winding the chains 36 around the shaft 25 and raising the locking member 27. As the locking member 27 rises the rolls 29 will engage the inclined surfaces 24 and force the upper ends 23 of the side bars 16 outwardly until said side bars assume the extreme opened position illustrated in Fig. 2. As the side bars 16 open the upwardly projecting ends 32 of the locking member 27 will hold the adjacent surfaces 34 of the said side bars in contact with each other.

A ratchet 38 fast to the shaft 25 is engaged by a pawl 39 pivotally mounted at 40 upon the cross piece 11 thereby preventing the shaft 25 from allowing the chains 36 to unwind and the locking member 27 to drop to again close the side bars 16. When it is desired to accomplish this purpose, however, a rod 41 may be pulled thereby releasing the pawl 39 from engagement with the said ratchet 38. When this is done the tendency is for the side bars 16 to close and force the locking member downward which added to the weight of said locking member tending to unwind the chains 36 makes the device very easy to operate to lock the side bars closed.

It is evident that the ratchet 38 and pawl 39 may hold the locking member 27 together with the side bars 16 in any intermediate position between those illustrated in Figs. 1 and 2, if it is so desired.

The inner surface of the side bars 16 which contacts with the necks of the cattle, is faced with a strip of wood 42.

The general operation of the stanchion is as follows: When the stanchion is arranged in series, and it is desired to release the entire herd of cattle detained by the several stanchions of said series, the operator rotates the shaft 25 by means of the hand wheel 37. The chains 36 being fastened to the shaft 25 will be wound around said shaft and as said chains become taut they will pull the locking member 27 vertically upward upon the upper end portions 23 of the side members 16, thereby forcing said side bars 16 from the position illustrated in Fig. 1 to the position illustrated in Fig. 2.

The side bars 16 of each stanchion are held in their opened position or in any intermediate position by the pawl 39 which engages the ratchet 38, thereby preventing a backward rotation of the shaft 25. The side bars being open the cattle detained thereby will be released and permitted to pass from their respective stalls.

If it is desired to release one animal from a stanchion which is connected in series with other stanchions, it is only necessary to enter the stall and separately raise the locking bar of that particular stanchion.

It is evident that any stanchion in the series may be rendered inoperative by the shaft 25 by simply disconnecting the chains 36 of said stanchion from the shaft 25.

After the cattle are driven into their respective stalls and it is desired to close the side bars, it is only necessary to pull upon the rod 41 thereby releasing the shaft 25 which then turns to unwind the chains 36 allowing the locking member to fall, whereupon the side bars will close and the cattle will be secured in their respective stanchions.

Because of the flexibility of the mechanism by which the side bars are suspended, the cattle detained thereby are permitted sufficient freedom as far as the swinging of their heads is concerned.

Having thus specifically described my invention, what I claim and desire to secure by Letters Patent is:

1. A cattle stanchion having, in combination, a pair of side bars having converging upper ends, means to suspend said side bars, means to lock said side bars in their closed position, a rotary member, and means operatively connecting said locking means with said rotary member adapted to raise said locking means vertically upon the converging ends of said side bars during the rotation of said rotary member and thereby force said side bars open.

2. A cattle stanchion having, in combination, a pair of side bars having converging upper ends, means to suspend said side bars in balanced relation to each other, means to lock said side bars in their closed position, a rotary member, and means operatively connecting said locking means with said rotary member adapted to raise said locking means vertically upon the converging ends of said side bars during the rotation of said rotary member and thereby force said side bars open.

3. A cattle stanchion having, in combination, a pair of side bars having converging upper ends, means to suspend said side bars in balanced relation to each other, means to lock said side bars in their closed position, a rotary member, means operatively connecting said locking means with said rotary member adapted to raise said locking means vertically upon and in sliding contact with the converging ends of said side bars during the rotation of said rotary member and thereby force said side bars open, and means to prevent said side bars from closing.

4. A cattle stanchion having, in combination, a pair of side bars the upper ends of said side bars being inclined toward each other, a balanced bar suspended from above said side bars, means to suspend said side bars from said balanced bar, means to lock said side bars in their closed position, a rotary member, and means operatively connecting said locking means with said rotary member adapted to raise said locking means vertically upon the inclined ends of said side bars during the rotation of said rotary member and thereby force said side bars open.

5. A cattle stanchion having, in combination a pair of side bars hinged together at their lower ends and converging at their upper ends, means to suspend said side bars in balanced relation to each other from above said side bars, means to lock said side bars in their closed position, a rotary member, and means operatively connecting said locking means with said rotary member adapted to raise said locking means vertically upon and in sliding contact with the converging ends of said side bars during the rotation of said rotary member and thereby force said side bars open.

6. A cattle stanchion having, in combination, a pair of side bars having converging upper ends, means to suspend said side bars in balanced relation to each other, means to lock said side bars in their closed position, a rotary member, means operatively connecting said locking means with said rotary member adapted to raise said locking means vertically upon and in contact with the upper ends of said side bars and thereby force said side bars apart, and means fast to said rotary member adapted to prevent a reverse movement of said rotary member whereby said side bars may be held in any partially opened position.

7. A cattle stanchion having, in combination, a pair of side bars having converging upper ends, means to suspend said side bars in balanced relation to each other, a locking member, means to prevent the accidental raising of said locking member by contact from below when said side bars are in their locked position, a rotary member, means operatively connecting said locking member with said rotary member adapted to raise said locking member vertically upon and in contact with the converging ends of said side bars and thereby force said side bars apart, and means fast to said rotary member adapted to prevent a reverse movement of said rotary member, whereby said side bars may be held in any partially opened position.

8. A cattle stanchion having, in combination, a pair of side bars having converging upper ends, means to suspend said side bars in balanced relation to each other, means to lock said side bars in their closed position, a rotary member, means operatively connecting said locking means with said rotary member adapted to raise said locking means vertically upon the upper ends of said side bars and thereby force said side bars apart, means fast to said rotary member adapted to prevent a reverse movement of said rotary member whereby said side bars may be held in any partially opened position, and means to release said rotary member whereby said side bars may be closed.

9. A cattle stanchion having, in combination, a pair of side bars hinged together at their lower ends, the upper ends of said side bars being inclined toward each other, means to suspend said side bars in balanced relation to each other, means to lock said side bars in their closed position, a rotary member, and means operatively connecting said locking means with said rotary member adapted to raise said locking means vertically upon the inclined ends of said side bars, whereby said side bars may be forced open.

10. A cattle stanchion having, in combination, a pair of side bars hinged together at their lower ends, the upper ends of said side bars being bent inwardly to form in their closed position an X, the upper ends of said side bars being also provided with oppositely disposed inclined surfaces, means to suspend said side bars in balanced relation to each other, means to lock said side bars in their closed position, a rotary member, and means operatively connecting said locking means with said rotary member adapted to raise said locking means vertically and in engagement with the inclined surfaces of the upper ends of said side bars whereby said side bars may be forced open.

11. A cattle stanchion having, in combination, a pair of side bars hinged together at their lower ends, the upper ends of said side bars being bent inwardly to form in their closed position an X, the upper ends of said side bars being also provided with oppositely disposed inclined surfaces, a locking member, rolls on said locking member adapted to engage said oppositely disposed inclined surfaces, a rotary member, and flexible means operatively connecting said locking member with said rotary member adapted to raise said locking member vertically upon the upper ends of said side bars and thereby force said side bars open.

12. A cattle stanchion having, in combination, a pair of side bars hinged together at their lower ends, the upper ends of said side bars being bent inwardly to form in their closed position an X, the upper ends of said side bars being also provided with oppositely disposed inclined surfaces, a locking member, said locking member being bent in the form of a reversed S and adapted to partly surround each of said side members, rolls on said locking member adapted to engage said oppositely disposed inclined surfaces, a rotary member, and flexible means operatively connecting said locking member with said rotary member adapted to raise said locking member vertically upon said side bars and thereby force said side bars open.

13. A cattle stanchion having, in combination, a pair of side bars hinged together at their lower ends, the upper ends of said side bars being bent inwardly to form in their closed position an X, the upper ends of said side bars being also provided with oppositely disposed inclined surfaces and adjacent contacting surfaces, a locking member, said locking member being bent in the form of a reversed S and adapted to partly surround each of said side members, rolls on said locking member adapted to engage said oppositely disposed inclined surfaces, a rotary member, flexible means operatively connecting said locking member with said rotary member adapted to raise said locking member vertically upon said side bars and thereby force said side bars open, and means integral with said locking member adapted to engage said side bars and hold the adjacent contacting surfaces of said side bars together.

In testimony whereof I have hereunto set my hand in presence of two subscribing witnesses.

AXEL FRITZ.

Witnesses:
FRANKLIN E. LOW,
KATHERINE M. JOYCE.